(12) United States Patent
Obaidi

(10) Patent No.: US 11,783,804 B2
(45) Date of Patent: Oct. 10, 2023

(54) VOICE COMMUNICATOR WITH VOICE CHANGER

(71) Applicant: T-Mobile USA, Inc., Bellevue, WA (US)

(72) Inventor: Ahmad Arash Obaidi, Sammamish, WA (US)

(73) Assignee: T-Mobile USA, Inc., Bellevue, WA (US)

(\*) Notice: Subject to any disclaimer, the term of this patent is extended or adjusted under 35 U.S.C. 154(b) by 276 days.

(21) Appl. No.: 17/080,784

(22) Filed: Oct. 26, 2020

(65) Prior Publication Data
US 2022/0130372 A1 Apr. 28, 2022

(51) Int. Cl.
| | | |
|---|---|---|
| *G10L 13/033* | (2013.01) | |
| *G10L 17/00* | (2013.01) | |
| *G10L 17/26* | (2013.01) | |
| *G06F 21/62* | (2013.01) | |

(52) U.S. Cl.
CPC ........ *G10L 13/033* (2013.01); *G06F 21/6254* (2013.01)

(58) Field of Classification Search
CPC ....... G10L 13/00; G10L 13/02; G10L 13/033; G10L 15/18; G10L 15/1822; G10L 17/00; G10L 21/003; G10L 17/22; G10L 17/24; G10L 17/26; H04M 3/42025
USPC .... 704/246, 257, 258, 266, 269, 270, 270.1, 704/250
See application file for complete search history.

(56) References Cited

U.S. PATENT DOCUMENTS

| | | | | |
|---|---|---|---|---|
| 5,911,129 A | * | 6/1999 | Towell | G10L 13/033 |
| | | | | 704/270 |
| 5,933,805 A | * | 8/1999 | Boss | G10L 19/0018 |
| | | | | 704/258 |
| 6,404,872 B1 | * | 6/2002 | Goldberg | H04M 3/40 |
| | | | | 379/88.16 |
| 6,950,799 B2 | * | 9/2005 | Bi | G10L 21/00 |
| | | | | 704/269 |
| 7,831,420 B2 | | 11/2010 | Sinder et al. | |
| 8,645,140 B2 | * | 2/2014 | Lobzakov | G10L 13/00 |
| | | | | 704/260 |
| 8,650,035 B1 | * | 2/2014 | Conway | G10L 21/013 |
| | | | | 704/260 |
| 8,775,535 B2 | | 7/2014 | Hugg et al. | |
| 8,898,055 B2 | | 11/2014 | Hirose et al. | |
| 9,318,108 B2 | | 4/2016 | Gruber et al. | |
| 10,755,695 B2 | * | 8/2020 | Alameh | G10L 13/033 |
| 11,545,132 B2 | * | 1/2023 | Abrami | G10L 13/00 |
| 2008/0319745 A1 | * | 12/2008 | Caldwell | G10L 17/26 |
| | | | | 704/235 |
| 2013/0006626 A1 | * | 1/2013 | Aiyer | G10L 17/24 |
| | | | | 704/235 |

(Continued)

*Primary Examiner* — Martin Lerner
(74) *Attorney, Agent, or Firm* — Han Santos, PLLC

(57) ABSTRACT

Methods, systems, and apparatus, including computer programs encoded on a computer storage medium, for identity management are disclosed. In one aspect, a method includes the actions of receiving, from a first computing device, first audio data that includes representations of one or more words in a first voice. The actions further include generating second audio data that includes representations of the one or more words in a second voice. The actions further include providing, for output to a second computing device, the second audio data.

18 Claims, 6 Drawing Sheets

(56) References Cited

U.S. PATENT DOCUMENTS

| | | | |
|---|---|---|---|
| 2015/0025888 A1* | 1/2015 | Sharp | G10L 17/00 |
| | | | 704/246 |
| 2016/0027431 A1* | 1/2016 | Kurzweil | G06F 40/117 |
| | | | 715/203 |
| 2017/0133017 A1 | 5/2017 | Rajakumar et al. | |
| 2017/0133018 A1* | 5/2017 | Parker | G10L 17/24 |
| 2017/0208163 A1* | 7/2017 | Paul | H04M 3/436 |
| 2017/0274289 A1 | 9/2017 | Judkins et al. | |
| 2018/0090126 A1* | 3/2018 | Peterson | G10L 13/033 |
| 2018/0190278 A1* | 7/2018 | Gupta | G10L 15/22 |
| 2018/0218727 A1* | 8/2018 | Cutler | G10L 13/033 |
| 2018/0342258 A1* | 11/2018 | Huffman | G10L 13/033 |
| 2019/0164554 A1* | 5/2019 | Huang | G10L 13/033 |
| 2019/0237084 A1* | 8/2019 | Talib | G10L 17/00 |
| 2019/0295528 A1* | 9/2019 | Rankin | G10L 15/30 |
| 2020/0312332 A1* | 10/2020 | Nishikawa | G10L 17/00 |
| 2020/0410976 A1* | 12/2020 | Zhou | G10L 13/033 |
| 2021/0217431 A1* | 7/2021 | Pearson | G10L 21/013 |
| 2021/0304783 A1* | 9/2021 | Kons | G10L 13/033 |
| 2021/0335337 A1* | 10/2021 | Gkoulalas-Divanis | |
| | | | G10L 13/00 |

\* cited by examiner

VOICE COMMUNICATOR WITH VOICE CHANGER

BACKGROUND

Speech synthesizers may be hardware or software that are configured to convert text into speech. Some speech synthesizers generate speech by concatenating pieces of recorded speech that are stored in a database. Other speech synthesizers can incorporate a model of the vocal tract and other human voice characteristics to create a synthetic voice output.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

When using a mobile phone, there are numerous ways that a user's privacy can be breached. The user may be tricked into installing malware or spyware that collects sensitive data. The user may be the victim of a phishing attack. The user may transmit sensitive information when connected to an unsecured network. Additionally, in the age of artificial intelligence, a user's speech may be recorded and used to train an artificial intelligence model that is able to generate speech in the user's voice. In order to prevent this type of attack, a user may choose to disguise the user's voice during a phone call. The user may make this choice during certain phone calls, such as those with untrusted parties and/or unrecognized phone numbers.

In order to reduce the likelihood of audio data of a user's voice from being collected and used to train an artificial intelligence model, the user's mobile phone may be configured to detect when the user is speaking. When the user is speaking, the mobile phone may activate a speech recognizer. The speech recognizer may generate a transcription of the audio data. The speech recognizer may provide the transcription to a speech synthesizer that generates speech using a voice selected by the user. The voice may be a voice characteristic model or other voice model that the speech synthesizer uses to generate speech in the voice. The mobile phone may then output the synthesized speech. In some instances, the mobile phone may automatically detect situations where the user's privacy may be compromised and automatically activate the voice changing feature. This may occur based on information detected by the network and/or based on detecting a change in the user's voice.

Converting a user's speech to another voice may be useful in additional situations beyond protecting a user's privacy. For example, a user may wish to convert the user's voice to a celebrity or character when talking to a member of the user's family. As another example, the user may elect to change the voice of the other party on the call. Instead of hearing the voice of the other party, the user may hear the other party talking in a different voice. The other party may not be aware of the voice change. In order to prevent nefarious actors from using this voice change service to their advantage, the network may provide an indication to a user when the other party on the call is using this service or when the other party is not using this service. This can help reduce the likelihood of a user being deceived by a voice that the user recognized.

Figure 1:
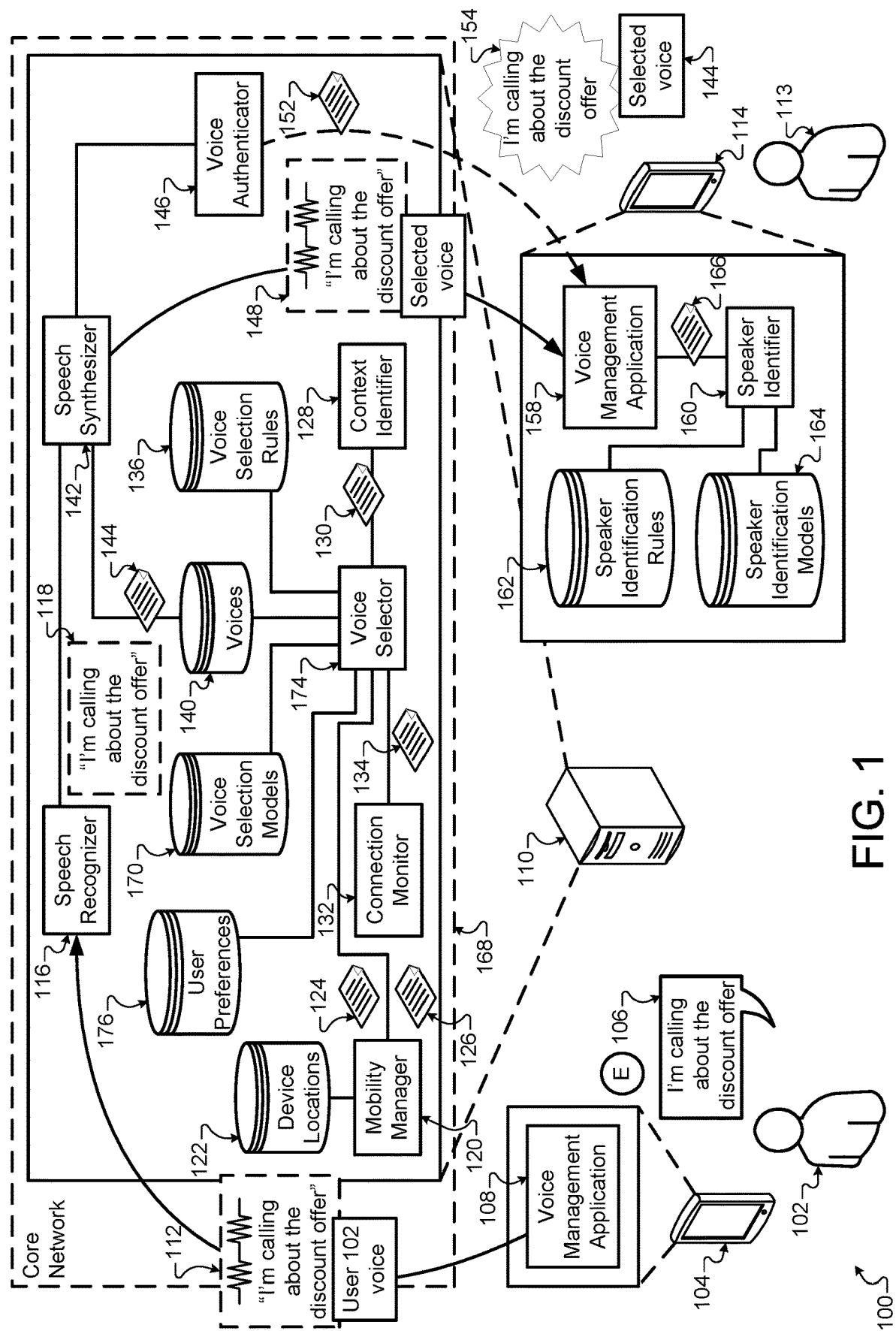
FIG. 1 illustrates an example system changing the voice of a user during a voice call.

FIG. 1 illustrates an example system changing the voice of a user during a voice call. Briefly, and as described in more detail below, the system 100 includes a server 110 that is configured to change the voice of the user 102 while the user 102 is having a voice call with the user 113. The server 110 is able to determine whether to change the voice of the user 102 based on the context of the voice call, characteristics of the connection between the client device 104 and the client device 114, the locations of the client device 104 and the client device 114, and/or any preferences 176 of the user 102 and user 113.

In more detail, the user 102 and the user 113 may be conducting a voice call using the client device 104 and the client device 114. The server 110 may be receiving and transmitting voice data between the client device 104 and the client device 114. Before or during the voice call, the server 110 may change the voice of the user 102 so that the user 113 hears the same words spoken by the user 102 but in a different voice than the voice of the user 102. The server 110 may change the voice of the user 102 automatically in cases where the user 102 may benefit from increased privacy protections. In some implementations, the server 110 may change the voice of the user 102 based on a request from or preferences 176 of either the user 102 and/or the user 113.

The user 102 and the user 113 are preparing to conduct a telephone conversation. The user 102 may have called the user 113, or the user 113 may have called the user 102. The user 102 may be using the client device 104 to conduct the telephone conversation, and the user 113 may be using the client device 114. The server 110 may be configured to take various actions to preserve the privacy of the users who are using client devices that are connected to the server 110. One of those actions may include disguising or changing the voice of the user 102. By disguising or changing the voice of the user 102, the server 110 may prevent the user 113 from at least accurately storing voice samples of the user 102 and training a system (e.g., an artificial intelligence system) to output speech in the voice of the user 102. The server 110 may include a voice selector 174 that is configured to determine when to disguise or change the voice of the user 102. The determination to disguise or change the voice of the user 102 may be based on the context of the voice call, characteristics of the connection between the client device 104 and the client device 114, the locations of the client device 104 and the client device 114, and/or any preferences 176 of the user 102 and user 113.

The voice selector 174 may be configured to determine the locations of the client device 104 and the client device 114 by communicating with the mobility manager 120 of the server 110. The mobility manager 120 is configured to monitor the location of the various devices that are communicating with the server 110. The mobility manager 120 may store the location data of the various devices in the device locations storage 122. The mobility manager 120 may determine the location of the various devices based on the base station with which each device is connected. In some instances, the mobility manager 120 may use triangulation using base stations that are able to communicate with each device to determine the location of each device. In some instances, each device may transmit, to the server 110, location data that may include GPS data that reflects a location of the device. The mobility manager 120 may receive those locations and store them in the device locations storage 122. The mobility manager 120 provides the voice selector the location data 124 of the client device 104 and location data 126 of the client device 114.

The location data 124 of the client device 104 and location data 126 of the client device 114 may change over time. The mobility manager 120 may periodically provide the voice selector 174 the location data 124 and the location data 126. For example, the mobility manager 120 may provide the voice selector 174 the location data 124 and the location data 126 every thirty seconds, even if the location data 124 and the location data 126 is substantially unchanged. In some implementations, the mobility manager 120 may provide the voice selector 174 the location data 124 and the location data 126 in response to a change in the location. For example, if there was a change in the location of the client device 104 and/or the location of the client device 114, then the mobility manager 120 may provide the voice selector 174 the location data 124 and/or the location data 126. In some implementations, the mobility manager 120 may provide the voice selector 174 the location data 124 and the location data 126 in response to a request from the voice selector 174. This may occur even if the location data 124 and the location data 126 are substantially unchanged.

The voice selector 174 may communicate with the context identifier 128 to determine the context 130 of the voice call between the user 102 and the user 113. The context identifier 128 may be configured to determine the context 130 of the voice call. The context 130 of the voice call may include several different parts that may change over time. The context 130 may include data related to the identity of the user 102, the identity of the user 113, the time, the date, the phone number or other identifier of the user 102, the phone number or other identifier of the user 113, the type of device of the client device 104, and the type of device of the client device 114. The context 130 may also include data related to the previous voice calls of the user 102 and the previous voice calls of the user 113. The data related to the previous voice calls may include the subject matter discussed during the previous voice calls, the time of the previous voice calls, the date of the previous voice calls, the other parties participating in the voice calls, the duration of the previous voice calls, and the types of devices used during the voice calls. The context 130 may also include data related to the weather and current events. If the user 102 or the user 113 have spoken during the voice call, then the context 130 may also include subject matter discussed and/or transcriptions of the utterances of the user 102 and the user 113.

The context 130 may change over time. The context identifier 128 may periodically provide the voice selector 174 the context 130. For example, the context identifier 128 may provide the voice selector the context 130 every thirty seconds, even if the context 130 is substantially unchanged. In some implementations, the context identifier 128 may provide the voice selector 174 the context 130 in response to a change in the context. For example, if there was a change in the current events or the weather, then the context identifier 128 may provide the voice selector 174 the context 130. In some implementations, the context identifier 128 may provide the voice selector 174 the context 130 in response to a request from the voice selector 174. This may occur even if the context 130 is substantially unchanged.

The voice selector 174 may communicate with the connection monitor 132 to determine the connection status 134 of the voice call between the user 102 and the user 113. The connection monitor 132 may be configured to determine the connection status 134 of the voice call and other characteristics of the wireless carrier network of the server 110. The server 110 may be included in a wireless carrier network that provides voice and data communication services to multiple devices, such as the client device 104, the client device 114, and other devices (not shown). The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards.

The wireless carrier network may include a radio access network and a core network 168 in which server 110 resides. The radio access network may include multiple base stations. The multiple base stations are responsible for handling voice and data traffic between multiple subscriber devices, such as the client device 104, the client device 114, and other devices and the core network 168. Accordingly, each of the base stations may provide a corresponding network cell that delivers telecommunication and data communication coverage within a geographic area. The core network 168 may use the network cells to provide communication services to the multiple subscriber devices. For example, the core network 168 may connect the multiple subscriber devices to other telecommunication and data communication networks, such as the Internet and the public switched telephone network (PSTN). The base stations are responsible for handling voice and data traffic between devices and the core network 168. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

The connection status 134 may include data related to the latency of the connections between the server 110 and the client device 104 and the server 110 and the client device 114. The connection status 134 may include data related to the bandwidth and bitrate of the connections between the server 110 and the client device 104 and the server 110 and the client device 114. The connection status 134 may indicate a signal strength, the signal-to-noise ratio, the signal-to-interference-plus-noise ratio, and any other similar signal parameters.

The connection status 134 changes over time. The connection monitor 132 may periodically provide the voice selector 174 the connection status 134. For example, the connection monitor 132 may provide the voice selector 174 the connection status 134 every thirty seconds, even if the connection status 134 is substantially unchanged. In some implementations, the connection monitor 132 may provide the voice selector 174 the connection status 134 in response to a change in the data included in the connection status 134. For example, if there was a change in the signal strength between the client device 114 and the base station, then the connection monitor 132 may provide the voice selector 174 the connection status 134. In some implementations, the connection monitor 132 may provide the voice selector 174 the connection status 134 in response to a request from the voice selector 174. This may occur even if the connection status 134 is substantially unchanged.

The voice selector 174 analyzes the location data 124, the location data 126, the context 130, the user preferences 176 of the user 102, the user preferences 176 of the user 113, and the connection status 134 using the voice selection models 170 and the voice selection rules 136. Based on the analysis, the voice selector 174 determines whether to change the voice of utterances of the user 102. If the voice selector 174 determines to change the voice of utterances of the user 102, then the voice selector 174 selects a voice 144 from the voices storage 140. The voice selection rules 136 may include rules that specify how to compare the location data 124, the location data 126, the context 130, the user preferences 176 of the user 102, the user preferences 176 of the user 113, and the connection status 134. For example, a voice selection rule may specify to change the voice of the user 102 if the user preferences 176 of the user 102 indicate to change the voice of the user 102. Another voice selection rule may specify to compare the phone number of the user 113 that is included in the context 130 to suspicious phone numbers. If the phone number of the user 113 matches a suspicious phone number, then the voice selector 174 will change the voice of the user 102. Suspicious phone numbers may be those that other users have identified as being linked to a scammer, a telemarketer, or similar types of potentially unsavory entities. The voice selector 174 may access suspicious phone numbers by accessing data stored by the wireless carrier network and/or the internet.

Another voice selection rule may specify to ignore the user preferences 176 of the user 102 if the connection status 134 indicates that the latency of the voice call is above a threshold, which may indicate that the added delay by changing the voice of the user 102 will decrease the quality of the voice call below an acceptable level. For example, a voice selection rule may indicate that an acceptable delay from when the user 102 speaks to when the user 113 hears audio from the client device 114 is five hundred milliseconds. If changing the voice of the user 102 increases the delay above five hundred milliseconds, then the voice selector 174 may bypass changing the voice of the user 102. Another voice selection rule may specify to change the voice of the user 102 if the client device 114 is located in particular locations. The particular locations may include countries where suspicious voice calls typically originate from. The voice selector 174 may access data identifying countries where suspicious voice calls typically originate from by accessing data stored by the wireless carrier network and/or the internet.

The voice selection rules 136 may also include rules for selecting a voice 144 from the voices storage 140. An example voice selection rule may indicate to select a particular voice according to the user preferences of the user 102. For example, a user preference may indicate to select a voice with a British accent during the hours of 9 am and 5 pm on Monday through Friday. As another example, a voice selection rule may indicate to select a generic voice that does not match a known user. This voice could be a combination of many different voices in order to create a voice that does not match a particular user. The voice selection rule may indicate to select the generic voice if the location of the client device 114 is in a country where suspicious voice calls typically originate from.

The voice selection models 170 may be configured to receive the location data 124, the location data 126, the context 130, and the connection status 134 and output data indicating a voice to select for changing the voice of the user 102 or data indicating not to change the voice of the user 102. Each voice selection model may be trained using machine learning and historical data that includes, from previous voice calls, location data of each participant, context data of the previous voice call, connection status data of the previous voice call, whether the participant's voice was changed, and, if so, the selected voice. The data from each of the previous calls may be included in a data sample. The server 110 may train one or more voice selection models using the data samples from the historical data and store them in the voice selection models 170.

In some implementations, the voice selection models 170 may be configured as two stages. A first stage is configured to receive the location data 124, the location data 126, the context 130, and the connection status 134 and output data indicating whether to change the voice of the user 102. If the first stage model outputs data indicating not to change the voice of the user 102, then the voice selector 174 may take no further action or may take action according to the voice selection rules 136. If the second stage model outputs data indicating to change the voice of the user 102, then the voice selector 174 provides the location data 124, the location data 126, the context 130, and the connection status 134 to a second stage model. The second stage model may be configured to output data indicating a voice to select for changing the voice of the user 102.

For the models of the two-stage process, the server 110 may be configured to train the models for each stage using the historical data and machine learning. The historical data may include, from previous voice calls, location data of each participant, context data of the previous voice call, connection status data of the previous voice call, whether the participant's voice was changed, and, if so, the selected voice. The server 110 may generate data samples to train the first stage models. The data samples may include, from the previous voice calls, location data of each participant, context data of the previous voice call, connection status data of the previous voice call, and whether the participant's voice was changed. The server 110 may train the first stage models using these data samples and machine learning. The server 110 may generate data samples to train the second stage models. The server 110 may generate these data samples from the historical data where the participant's voice was changed. The historical data where the participant's voice was not changed may not be used to generate the data samples for the second stage models. The data samples may include, from the previous voice calls where the participant's voice was changed, location data of each participant, context data of the previous voice call, connection status data of the previous voice call, and the selected voice to change the participant's voice. The server 110 may train the second stage models using these data samples and machine learning.

In some implementations, the voice selector 174 may use a combination of the voice selection models 170 and the voice selection rules 136 to determine whether to change the voice of the user 102. The voice selector 174 may use the voice selection models 170 to determine whether to change the voice of the user 102, and if so, what voice from the voices storage 140 to select. The voice selector 174 may apply the voice selection rules 136 to the location data 124, the location data 126, the context 130, the user preferences 176 of the user 102, the user preferences 176 of the user 113, and the connection status 134. If the voice selection rules 136 indicate to perform the same action as the voice selection models 170, then the voice selector 174 may perform that action. If the voice selection rules 136 indicate to perform a different action as the voice selection models 170, then the voice selector 174 may perform the action based on whether the applied rules or the models are ranked higher. In some instances, the voice selection models 170 and the voice selection rules 136 may be ranked. If there is a conflict between the action output by any of the voice selection models 170 or the voice selection rules 136, then the voice selector 174 may select the action output by the higher ranking rule or model.

In the example of FIG. 1, the voice selector 174 may apply the voice selection models 170 and the voice selection rules 136 to the location data 124, the location data 126, the context 130, the user preferences 176 of the user 102, the user preferences 176 of the user 113, and the connection status 134 and determine to change the voice of the user 102 to the voice 144 that is included in the voices storage 140. The voice selection models 170 and the voice selection rules 136 may select the voice 144 to protect the privacy of the user 102 because based on the location data 124, the location data 126, the context 130, and the connection status 134, there may be a risk that the user 113 and/or the client device 114 may record the voice of the user 102. With the voice of the user 102 recorded, the user 113 may be able to train a speech synthesizer to output speech that sounds like the user 102.

The voice selector 174 may select the voice 144 after the user 102 initiates the voice call or after the client device 104 begins ringing if the user 113 called the user 102. The speech synthesizer 142 is configured to generate the new speech using the voice 144. The user 102 speaks the utterance 106, "I'm calling about the offer," to the client device 104. The client device 104 may include a voice management application 108. The user 102 may provide the user preferences 176 of the user 102 to the voice management application 108, which may be used by the voice selector 174 to determine whether to change the voice of the user 102. The client device 104 provides the audio data 112 of the utterance 106 to the server 110.

The server 110 includes a speech recognizer 116 that is configured to transcribe the audio data 112. The speech recognizer 116 may use language models and acoustic models to transcribe the audio data 112. In some implementations, the speech recognizer may use models trained using machine learning to transcribe the audio data 112. The speech recognizer 116 receives the audio data 112 and generates the transcription 118, "I'm calling about the offer." The speech recognizer 116 provides the transcription 118 to the speech synthesizer 142.

The speech synthesizer 142 generates the audio data 148 by generating speech using the transcription 118 and the voice 144. The audio data 148 may represent the utterance, "I'm calling about the discount offer," in the voice 144, which is different than the voice of the user 102. The server 110 may provide the audio data 148 to the client device 114.

The client device 114 receives the audio data 148 and outputs the audio data 148 through a speaker or other audio channel. The user 113 hears the audio output 154 in the voice 144 selected by the voice selector 174. The user 113 may respond and speak into the client device 114. The client device 114 may transmit audio data of the speech of the user 113 to the server 110. The server 110 may transmit the audio data of the speech of the user 113 to the client device 104. The client device 104 may output the audio data of the speech of the user 113 through a speaker or other audio channel of the client device 104.

In some implementations, the context identifier 128 may be configured to monitor the topics of the voice call. To monitor the topics of the voice call, the context identifier 128 may receive transcriptions from the speech recognizer 116. The server 110 may provide audio data received from the client device 114 to the speech recognizer 116. With transcriptions from utterances of the user 102 and transcriptions from utterances of the user 113, the context identifier 128 may update the context 130 and provide that updated context 130 to the voice selector 174. The voice selector 174 may apply the voice selection models 170 and the voice selection rules 136 to the updated context 130, the location data 124, the location data 126, the connection status 134 and any user preferences 176. The voice selector 174 may update the previous action related to changing the voice of the user 102 and instruct the speech recognizer 116 and speech synthesizer 142 according to the new actions.

For example, the voice selector 174 may initially determine to bypass changing the voice of the user 102. During the conversation, the context identifier 128 may update the context 130 based on the transcriptions of the conversation, the connection monitor 132 may update the connection status 134, or the mobility manager 120 may update the locations of the client device 104. Based on this updated data, the voice selector 174 may determine to change the voice of the user 102 to a voice included in the voices storage 140. This may happen because the topics discussed during the voice call may indicate that a privacy breach may occur. Some of these topics may include free offers or other topics that indicates the conversation may be related to a questionable topic. While the user 113 may have been able to record some of the speech of the user 102, by limiting the speech samples, the user 113 may be less likely to generate a speech synthesizer to imitate the user 102.

In some implementations, the server 110 may include a voice authenticator 146. The voice authenticator 146 may be configured to provide authentication data 152 indicating whether the voice of the audio data 148 matches the voice of the user 102 or whether the server 110 changed the voice. The voice authenticator 146 may not provide authentication data 152 during each voice call. In some implementations, the authentication data 152 may include data identifying the voice 144. For example, if the voice 144 is that of a cartoon character or a celebrity, then the authentication data 152 may identify the voice 144.

The client device 114 may include a voice management application 158 that receives the authentication data 152. The voice management application 158 may generate a graphical interface based on the authentication data 152. The graphical interface may indicate whether the voice of the audio data 148 matches the voice of the user 102 or whether the voice was changed. In some instances, the graphical interface may indicate an identity of the voice 144.

In some implementations, the client device 114 includes a speaker identifier 160. The speaker identifier 160 may be configured to determine an identity of the user 102 even in instances where the server 110 changed the voice of the audio data 148. The speaker identifier 160 may use speaker identification rules 162 and/or speaker identification models 164 to determine an identity of the user 102. The speaker identifier 160 may analyze the audio data 148 and determine the word choice, sentence structure, vocabulary, cadence, pause length, and other similar characteristics of the speech in the audio data 148. The speaker identification rules 162 may include one or more comparisons for the word choice, sentence structure, vocabulary, cadence, pause length, and other characteristics and indicate an identity of the user 102. The speaker identification models 164 may be trained using machine learning and voice samples of different users and voice samples of the same users' words being output by a speech synthesizer using different voices. In some instances, the speaker identification rules 162 and/or speaker identification models 164 may be able to identify a particular user if the speaker identification rules 162 and/or speaker identification models 164 were generated or trained using samples from that particular user.

The voice management application 158 may receive the identification data 166 from the speaker identifier 160. The identification data 166 may identity the user 102. The voice management application 158 may generate a graphical interface for display on the client device 114 that indicates the identity of the user 102. The speaker identifier 160 may not provide identification data 166 during each voice call.

In some implementations, some of the components of the server 110 may be implemented by the client device 104 and/or the client device 114. In some implementations, some of the components of the client device 104 and/or the client device 114 may be implemented by the server 110.

Figure 2:
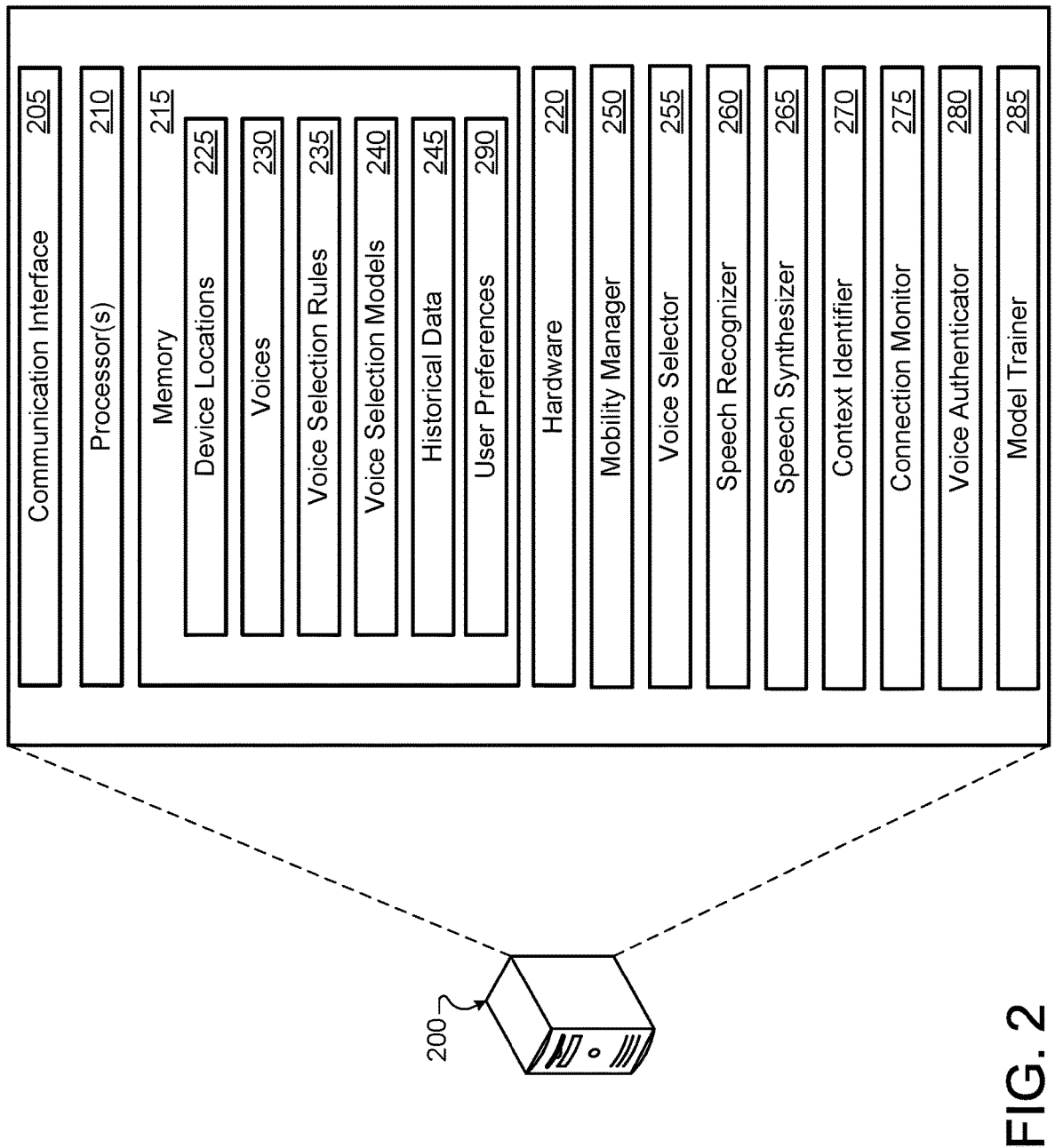
FIG. 2 illustrates an example server that is configured to change the voice of a user during a voice call.

FIG. 2 illustrates an example server 200 that is configured to change the voice of a user during a voice call. The server 200 may be any type of computing device that is configured to be integrated into a wireless carrier network or interact with a wireless carrier network. For example, the server 200 may be similar to the server 110 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices directly or indirectly connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a mobility manager 250. The mobility manager 250 may be similar to the mobility manager 120 of FIG. 1. The mobility manager 250 may be configured to monitor the location of a computing device that is connected to the server 200 through a wireless base station such as a gNodeB. The location of the computing device may include the wireless base station to which the computing device is connected and/or GPS data received from the subscriber device. The mobility manager 250 may store the location data in the device locations 225 that is implemented by the memory 215.

In some implementations, the mobility manager 250 may determine the location of a computing device at periodic intervals, such as every five seconds. In some implementations, the mobility manager 250 may determine the location of a computing device when the computing device connects to a different wireless base station and/or provides updated GPS data. In some implementations, the mobility manager 250 may determine the location of the computing device relative to the base station with which the computing device is communicating. In this case, the mobility manager 250 may determine the relative location based on data collected from the base station such as signal strength and direction of communications between the computing device and the base station. The mobility manager 250 may also determine the relative location based on the location of the base station and GPS data received from the computing device. The relative location data may include a distance between the computing device and the base station, the cardinal direction from the base station to the subscriber device, and/or any other similar measurements.

The one or more processors 210 may implemented a context identifier 270. The context identifier 270 may be similar to the context identifier 128 of FIG. 1. The context identifier 270 may be configured to determine the context of a voice call between users. The context of the voice call may include several different parts that may change over time. The context may include data related to the identity of the users, the time, the date, the phone number or other identifier of the users, and the type of device of the client device used by each of the users. The context may also include data related to the previous voice calls of the users. The data related to the previous voice calls may include the subject matter discussed during the previous voice calls, the time of the previous voice calls, the date of the previous voice calls, the other parties participating in the voice calls, the duration of the previous voice calls, and the types of devices used during the voice calls. The context may also include data related to the weather and current events. If either of the users have spoken during the voice call, then the context may also include the subject matter discussed and/or transcriptions of the utterances of the users.

The context may change over time. The context identifier 270 may periodically provide the voice selector 255 the context. For example, the context identifier 270 may provide the voice selector 255 the context every thirty seconds, even if the context is substantially unchanged. In some implementations, the context identifier 270 may provide the voice selector 255 the context in response to a change in the context. For example, if there was a change in the current events or the weather, then the context identifier 270 may provide the voice selector 255 the context. In some implementations, the context identifier 270 may provide the voice selector 255 the context in response to a request from the voice selector 255. This may occur even if the context is substantially unchanged.

The one or more processors may implement a connection monitor 275. The connection monitor 275 may be similar to the connection monitor 132 of FIG. 1. The connection monitor 275 may be configured to determine the connection status of a voice call and other characteristics of the wireless carrier network of the server 200. The connection status may include data related to the latency of the connections between the server 200 and the client devices of the users. The connection status may include data related to the bandwidth and bitrate of the connections between the server 200 and the client devices of the users. The connection status may indicate the signal strength, the signal-to-noise ratio, the signal-to-interference-plus-noise ratio, and any other similar signal parameters of the connections between the server 200 and the client devices of the users.

The connection status change over time. The connection monitor 275 may periodically provide the voice selector 255 the connection status. For example, the connection monitor 275 may provide the voice selector 255 the connection status every thirty seconds, even if the connection status is substantially unchanged. In some implementations, the connection monitor 275 may provide the voice selector 255 the connection status in response to a change the data included in the connection status. For example, if there was a change in the signal strength between a client device and the base station, then the connection monitor 275 may provide the voice selector 255 the connection status. In some implementations, the connection monitor 275 may provide the voice selector 255 the connection status in response to a request from the voice selector 255. This may occur even if the connection status is substantially unchanged.

The one or more processors may implement a voice selector 255. The voice selector 255 may be similar to the voice selector 174 of FIG. 1. The voice selector 255 may be configured to analyze the location data of the client devices, the context, the connection status, and the preferences 290 of any users using the voice selection models 240 and the voice selection rules 235. Based on the analysis, the voice selector 255 determines whether to change the voice of utterances of either of the users. If the voice selector 255 determines to change the voice of utterances a user, then the voice selector 255 selects a voice from the voices 230. The voice selection rules 235 may include rules that specify how to compare the location data of the client devices, the context, the preferences 290 of the users, and the connection status. For example, a voice selection rule may specify to change the voice of a user if the preferences 290 of the user indicate to change the voice of the user. Another voice selection rule may specify to compare the phone number of one of the users to known suspicious phone numbers. If the phone number of one of the users matches a suspicious phone number, then the voice selector 255 will change the voice of the other user. Suspicious phone numbers may be those that other users have identified as being linked to a scammer, a telemarketer, or other similar types of entities. The voice selector 255 may access the suspicious phone numbers by accessing data stored by the wireless carrier network and/or the internet.

Another voice selection rule may specify to ignore the preferences 290 of the users if the connection status indicates that the latency of the voice call is above a threshold, which may indicate that the added delay by changing a user's voice will decrease the quality of the voice call below an acceptable level. For example, a voice selection rule may indicate that an acceptable delay from when a user speaks to when the other user hears audio from a client device is five hundred milliseconds. If changing the voice of the user increases the delay above five hundred milliseconds, then the voice selector 255 may bypass changing the voice of the user. Another voice selection rule may specify to change the voice of a user if the client device of the other user is located in one of several particular locations. The particular locations may include countries where suspicious voice calls typically originate from. The voice selector 255 may access data identifying countries where suspicious voice calls typically originate from by accessing data stored by the wireless carrier network and/or the internet.

The voice selection rules 235 may also include rules for selecting a voice from the voices 230. An example voice selection rule may indicate to select a particular voice according to the user preferences 290. For example, a user preference may indicate to select a voice with a British accent during the hours of 9 am and 5 pm on Monday through Friday. As another example, a voice selection rule may indicate to select a generic voice that does not match a known user. This voice could be a combination of many different voices in order to create a voice that does not match a particular user. The voice selection rule may indicate to select the generic voice if the location of the client device of the other user is in a country where suspicious voice calls typically originate from.

The voice selection models 240 may be configured to receive the location data of the client devices, the context, and the connection status and output data indicating a voice to select for changing the voice of a user or data indicating not to change the voice of a user. Each voice selection model may be trained using machine learning and historical data 245 that includes, from previous voice calls, location data of each participant, context data of the previous voice call, connection status data of the previous voice call, whether the participant's voice was changed, and, if so, the selected voice. The data from each of the previous calls may be included in a data sample. The model trainer 285 may train one or more voice selection models using the data samples from the historical data and store them in the voice selection models 240.

In some implementations, the voice selection models 240 may be configured as two stages. A first stage is configured to receive the location data of the client devices, the context, and the connection status and output data indicating whether to change the voice a user. If the first stage model outputs data indicating not to change the voices of the users, then the voice selector 255 may take no further action or may take action according to the voice selection rules 235. If the second stage model outputs data indicating to change the voice of a user, then the voice selector 255 provides the location data of the client devices, the context, and the connection status to a second stage model. The second stage model may be configured to output data indicating a voice to select for changing the voice of a user.

For the models of the two-stage process, the model trainer 285 may be configured to train the models for each stage using the historical data 245 and machine learning. The historical data 245 may include, from previous voice calls, location data of each participant, context data of the previous voice call, connection status data of the previous voice call, whether the participant's voice was changed, and, if so, the selected voice. The model trainer 285 may generate data samples to train the first stage models. The data samples may include, from the previous voice calls, location data of each participant, context data of the previous voice call, connection status data of the previous voice call, and whether the participant's voice was changed. The model trainer 285 may train the first stage models using these data samples and machine learning. The model trainer 285 may generate data samples to train the second stage models. The model trainer 285 may generate these data samples from the historical data 245 where the participant's voice was changed. The historical data where the participant's voice was not changed may not be used to generate the data samples for the second stage models. The data samples may include, from the previous voice calls where the participant's voice was changed, location data of each participant, context data of the previous voice call, connection status data of the previous voice call, and the selected voice to change the participant's voice. The model trainer 285 may train the second stage models using these data samples and machine learning.

In some implementations, the voice selector 255 may use a combination of the voice selection models 240 and the voice selection rules 235 to determine whether to change the voice of a user. The voice selector 255 may use the voice selection models 240 to determine whether to change the voice of a user, and if so, what voice from the voices 230 to select. The voice selector 255 may apply the voice selection rules 235 to the location data of the client devices, the context, the preferences 290 of the users, and the connection status. If the voice selection rules 235 indicate to perform the same action as the voice selection models 240, then the voice selector 255 may perform that action. If the voice selection rules 235 indicate to perform a different action as the voice selection models 240, then the voice selector 255 may perform the action based on whether the applied rules or the models are ranked higher. In some instances, the voice selection models 240 and the voice selection rules 235 may be ranked. If there is a conflict between the action output by any of the voice selection models 240 or the voice selection rules 235, then the voice selector 255 may select the action output by the higher-ranking rule or model.

In some implementations, the voice selector 255 may use a combination of the voice selection models 240 and the voice selection rules 235 in a two-stage process. The voice selector 255 may use the voice selection models 240 or the voice selection rules 235 to determine whether to change the voice of a user, and may use the other of the voice selection models 240 or the voice selection rules 235 to determine what voice to select. For example, the voice selector 255 may use the voice selection models 240 to determine whether to change the voice of the user. The voice selection models 240 may be suited to identify situations where the privacy of the user may be compromised. If the voice selection models 240 determines to change the voice of the user, then the voice selector 255 may use the voice selection rules 235 to determine what voice to select. The voice selection rules 235 may be suited to select a voice in instances where the voice selection rules 235 use user preferences 290 as a factor in selecting a voice.

The one or more processors may implement a speech recognizer 260. The speech recognizer 260 may be similar to the speech recognizer 116 of FIG. 1. The speech recognizer 260 may be configured to transcribe audio data received from client devices. The audio data may encode speech of a user. The speech recognizer 260 may use language models and acoustic models to transcribe the audio data. In some implementations, the speech recognizer may use models trained using machine learning to transcribe the audio data.

The one or more processors may implement a speech synthesizer 265. The speech synthesizer 265 may be similar to the speech synthesizer 142 of FIG. 1. The speech synthesizer 265 may be configured to receive a transcription and voice data and output audio data that encodes speech of the transcription in the voice. The speech synthesizer 265 may receive an additional transcription and different voice data and output audio data that encodes speech of the transcription in the different voice.

In some implementations, the server 200 may include a voice authenticator 280. The voice authenticator 280 may be configured to provide authentication data that indicates whether voice of the audio data output by the server 200 to a client device matches the voice of the user who spoke the words of the audio data. For example, if the server 200 receives audio data from a client device and provides audio data to another client device, then the voice authenticator 280 may include authentication data that indicates that the voice in the audio data is unchanged. If the server receives audio data form a client device, generates new audio data in a different voice, and provides the new audio data in the different voice to another client device, then the voice authenticator 280 may include authentication data that indicates that the voice in the audio data has been changed. The voice authenticator 280 may not provide authentication data during each voice call. In some implementations, the voice authenticator 280 may provide authentication data in response to a request from one or both of the users participating in the voice call. In some implementations, the authentication data may include data identifying the voice. For example, if the voice is that of a cartoon character or a celebrity, then the authentication data 152 may identify the voice.

Figure 3:
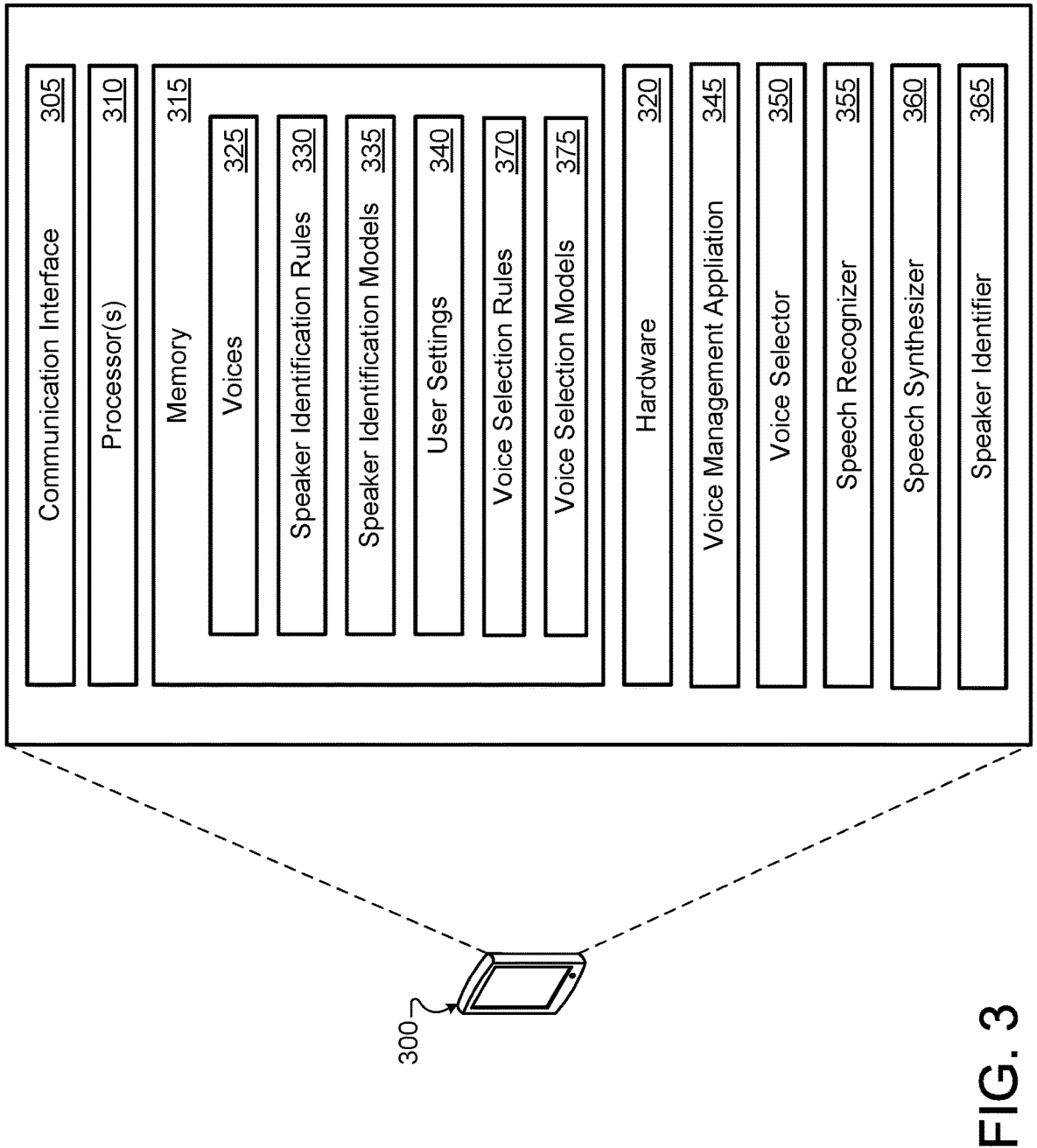
FIG. 3 illustrates an example client device that is configured to change the voice of a user during a voice call.

FIG. 3 illustrates an example client device 300 that is configured to change the voice of a user during a voice call. The client device 300 may be any type of computing device that is configured to interact with a wireless carrier network. For example, the client device 300 may be similar to the client device 104 or the client device 114 of FIG. 1. Some of the components of the client device 300 may be implemented in a single computing device or distributed over multiple computing devices. Some of the components may be in the form of virtual machines or software containers that are hosted in a cloud in communication with disaggregated storage devices. Some client devices may include a subset of the components illustrated in FIG. 3. For example, a client device may not include the speech recognizer 355, the speech synthesizer 360, or the voices 325.

The client device 300 may include a communication interface 305, one or more processors 310, memory 315, and hardware 320. The communication interface 305 may include communication components that enable the client device 300 to transmit data and receive data from devices connected to the wireless carrier network. The communication interface 305 may include an interface that is configured to communicate with base stations of a wireless carrier network. The communication interface 305 may receive data that other devices transmit to the base stations and/or transmit data to the base stations for transmission to the other devices.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 310 may implement a voice management application 345. The voice management application 345 may be similar to the voice management application 108 and the voice management application 158 of FIG. 1. The voice management application 345 may be configured to receive user preferences and other input from the user. The voice management application 345 may store the user preferences in the user settings 340. For example, the user may indicate when to change the voice of the user and what voice to use. As another example, the user may indicate before a voice call whether to change the voice of the user for that voice call. As another example, the user may indicate what voice to use for incoming voice calls. The voice management application 345 may store each of these user preferences in the user settings 340. In some implementations, the user preferences may identify other users and to use particular voices for particular users. For example, a user preference may indicate to use the voice of a cartoon character when calling the child of the user. A user preference may indicate to use the voice of a celebrity who is in several action movies as a replacement for the voice of the supervisor of the user. The voice management application 345 may also be configured to provide user settings 340 to a server.

The one or more processors 310 may implement a voice selector 350. The voice selector 350 may be similar to the voice selector 174 of FIG. 1 and/or the voice selector 255 of FIG. 2. In some implementations, the voice selector 350 may apply voice selection rules 370 and/or voice selection models 375 to location data, connection status data, context data, and/or user preferences to determine whether to adjust the voice of the speech of the user of the client device 300 and if so, what voice to select. In some implementations, the voice selector 350 may be configured to implement the user settings 340. In this case, the user may provide the user settings 340 through the voice management application 345, and the voice selector 350 may implement those user settings 340. In some implementations, the user settings 340 may include data identifying contacts, phone numbers, and other identifiers of users or entities and settings related to each one. Some user settings 340 may indicate to use specific voices with specific users. Other user settings 340 may include suspicious phone numbers that have called the computing device 300. The users settings 340 may indicate to use a particular voice with the suspicious phone numbers.

For example, the user settings 340 may indicate to change the voice of the user to match that of a cartoon character. The user settings 340 may indicate to change the voice of the user when the user is talking to a particular other user. The voice selector 350 may access the user settings 340. Based on the user settings 340 indicating to change the voice of the user to a cartoon character and the user being in a voice call with the other user, the voice selector 350 may select the cartoon character voice from the voices 325. The voice selector 350 may provide the voice of the cartoon character to the speech synthesizer 360. When the user speaks into a microphone or other audio input device of the client device 300, the speech recognizer 355 processes the audio data of the speech of the user. The speech recognizer 355 generates a transcription of the audio data of the speech of the user. The speech synthesizer 360 generates speech audio of the transcription in the voice of the cartoon character. The client device 300 outputs the speech audio to the server. The client device of the other user receives the audio from the server, and the other user hears the speech in the voice of the cartoon character.

In some instances, the other user hearing the voice of the cartoon character may not wish to hear the voice of the cartoon character. In this case, the other user may indicate to a voice management application running client device of the other user, to change the voice of the cartoon character. The other user may indicate to change the voice of the cartoon character to a different voice stored in the client device of the other user or in the server. In this case, the server or the client device of the other user may include a speech recognizer and speech synthesizer that transcribes the audio data of the cartoon character and generates new audio in the voice selected by the other user. In some implementations, the server may receive the request to change the voice of the cartoon character and provide a request to the voice management application 345. The voice management application 345 may generate a prompt indicating that the other user wishes to change the voice of the cartoon character. The user of the client device 300 may accept that request and turn off the voice change function. The user of the client device 300 may reject the request and continue with the voice of the cartoon character. The user of the client device 300 may accept that request and select a new voice. In some implementations, the voice management application 345 may provide a recommendation to the user of the client device 300. For example, if the voice management application 345 determines that the likelihood of the privacy of the user will be breached if the user turns off the voice change function, then the voice management application 345 may provide an indication to the user to select a new voice instead of turning off the voice change function.

As another example, the user settings 340 may indicate to change the voice of the other user on a voice call so that instead of hearing the voice of the other user, the user hears the voice of a celebrity. The other user may be unaware the user changed the voice of the other user. Based on these user settings 340, the voice selector 350 may select the celebrity voice from the voices 325. The voice selector 350 may provide the voice of the celebrity to the speech synthesizer 360. The client device 300 receives the audio data that encodes the speech of the other user. The speech recognizer 355 processes that audio data and generates a transcription of the speech of the other user. The speech synthesizer 360 generates speech audio data of the transcription in the voice of the celebrity. The client device 300 outputs the celebrity speech audio data through a speaker or another audio channel.

The one or more processors 310 may implement a speaker identifier 365. The speaker identifier 365 may be similar to the speaker identifier 160 of FIG. 1. The speaker identifier 365 may be configured to determine an identity of another user participating in a voice call even in instances where the voice of the other user is changed. The speaker identifier 365 may use the speaker identification rules 330 and/or the speaker identification models 335 to determine an identity of the other user. The speaker identifier 365 may analyze the received audio data and determine the word choice, sentence structure, vocabulary, cadence, pause length, and other similar characteristics of the speech in the received audio data. The speaker identification rules 330 may include one or more comparisons for the word choice, sentence structure, vocabulary, cadence, pause length, and other characteristics and indicate an identity of the other user. The speaker identification models 335 may be trained using machine learning and voice samples of different users and voice samples of the same users' words being output by a speech synthesizer using different voices. The voice samples may each be labeled with the identity of the original speaker. In some instances, the speaker identification rules 330 and/or speaker identification models 335 may be able to identify a particular user if the speaker identification rules 330 and/or speaker identification models 335 were generated or trained using samples from that particular user.

Figure 4:
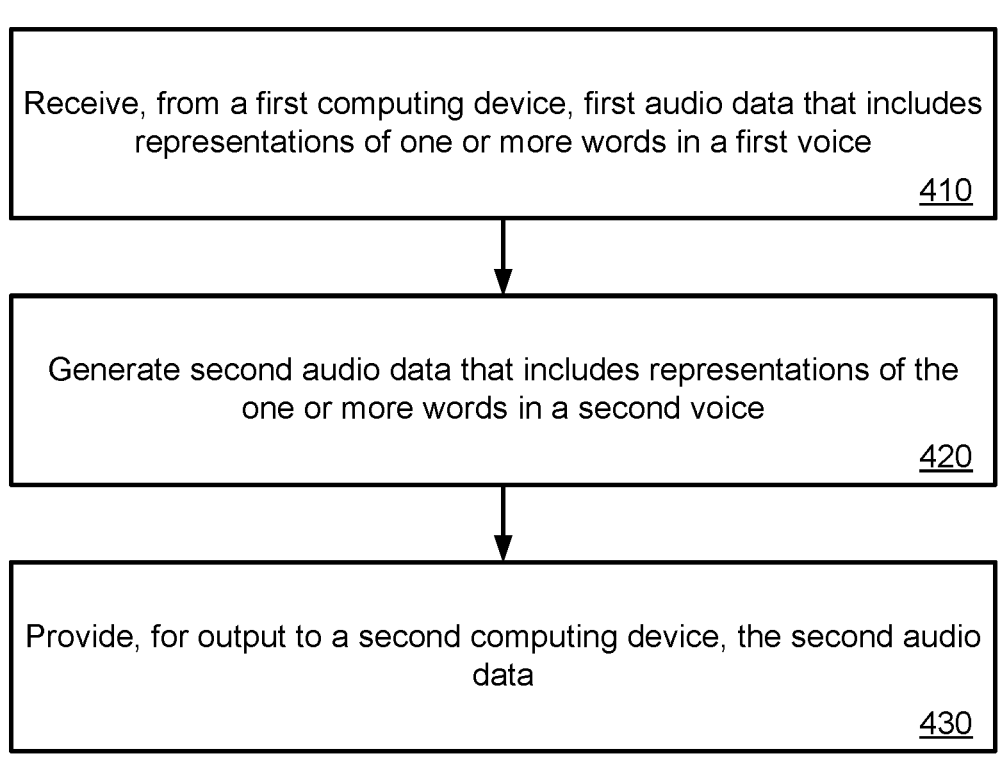
FIG. 4 is a flowchart of an example process for changing the voice of a user.

FIG. 4 is a flowchart of an example process 400 for changing the voice of a user. In general, the process 400 receives audio data that encodes the speech of a user. The process 400 transcribes that audio data and generates new audio data in a voice that is different than the user. The process 400 outputs the new audio data. The process 400 will be described as being performed by the server 110 of FIG. 1 and will include references to other components in FIG. 1. The process 400 may also be performed by the server 200 of FIG. 2 and/or the client device 300 of FIG. 3.

The server 110 receives, from a first computing device 104, first audio data 112 that includes representations of one or more words in a first voice (410). The user 102 of the first computing device 104 may be having a voice call with the user 113 of a second computing device 114. The user 102 may speak into a microphone or other audio channel of the first computing device 104. The first computing device may provide the first audio data 112 of the speech of the user 102 to the server 110.

The server 110 generates second audio data 148 that includes representations of the one or more words in a second voice 144 (420). The server 110 may include a voice selector 174 that is configured to select the second voice 144. The voice selector 174 may select the second voice 144 from multiple voices in the voices storage 140. The voice selector 174 may select the second voice 144 using the voice selection models 170 and/or the voice selection rules 136. The voice selector 174 may use the locations of the first computing device 104 and the second computing device 114, the status of the connection between the first computing device 104 and the second computing device 114 and the server 110, and the context to select the second voice 144. In some implementations, the voice selector 174 may use the voice selection models 170 and/or the voice selection rules 136 and the locations of the first computing device 104 and the second computing device 114, the status of the connection between the first computing device 104 and the second computing device 114 and the server 110, and the context to determine whether to generate the second audio data 148.

In some implementations, the server 110 determines an identity of the user 113 of the second computing device 114. Based on the identity of the user 113 of the second computing device 114, the server 110 determines to generate the second audio data 148. For example, the voice selector 174 of the server 110 may determine that that the likelihood of the privacy of the user 102 being breached is greater than a threshold based on the identity of the user 113. Based on this determination, the voice selector 174 may determine to generate the second audio data 148. As another example, the voice selector 174 may determine that based on a preference of the user 113, the user 113 wishes to hear a particular voice during voice calls. Based on this determination, the voice selector 175 may determine to generate the second audio data 148 using the particular voice.

In some implementations, the server 110 determines an identity of the user 102 of the first computing device 114. Based on the identity of the user 102, the server 110 determines to generate the second audio data 148. For example, the user 102 may provide preferences to the server 110 that indicate when to generate the second audio data 148 and what voice to select. The user 102 may indicate to select the voice of a cartoon character on Saturdays between 8 am and 11 am. If the voice call is occurring on Saturday at 9 am, then the server 110 generates the second audio data 148 using the voice 144 of the cartoon character.

In some implementations, the server 110 includes a context identifier 128. The context identifier 128 may be configured to determine the context 130 of the voice call between the user 102 of the first computing device 104 and the user 113 of the second computing device 114. Based on the context 130, the server 110 may determine whether to generate the second audio data 148. If the server 110 determines to generate the second audio data 148, then the server 110 may use the context 130 to select the second voice 144.

The context 130 may include data related to the identity of the user 102, the identity of the user 113, the time, the date, the phone number or other identifier of the user 102, the phone number or other identifier of the user 113, the type of device of the first computing device 104, and the type of device of the second computing device 114. The context 130 may also include data related to the previous voice calls of the user 102 and the previous voice calls of the user 113. The data related to the previous voice calls may include the subject matter discussed during the previous voice calls, the time of the previous voice calls, the date of the previous voice calls, the other parties participating in the voice calls, the duration of the previous voice calls, and the types of devices used during the voice calls. The context 130 may also include data related to the weather and current events. If the user 102 or the user 113 have spoken during the voice call, then the context 130 may also include subject matter discussed and/or transcriptions of the utterances of the user 102 and the user 113.

In some implementations, the first computing device 104 and/or the second computing device 114 selects the second voice 144. The user 102 may provide preferences of the user 102 to the first computing device 104. The first computing device 104 may provide those preferences to the server 110. The user 113 may provide preferences of the user 113 to the second computing device 114. The second computing device 114 may provide those preferences to the server 110. The server 110 may select the second voice 144 based on the preferences of the user 102 to the first computing device 104 and/or the preferences of the user 113 to the second computing device 114.

In some implementations, the server 110 includes a connection monitor 132. The connection monitor 132 may be configured to determine a connection status 134 of the connections between the server 110 and the first computing device 104 and the second computing device 114. Based on the connection status 134, the server 110 may determine whether to generate the second audio data 148. If the server 110 determines to generate the second audio data 148, then the server 110 may use the connection status 134 to select the second voice 144.

The connection status 134 may include data related to the latency of the connections between the server 110 and the first computing device 104 and the server 110 and the second computing device 114. The connection status 134 may include data related to the bandwidth and bitrate of the connections between the server 110 and the first computing device 104 and the server 110 and the second computing device 114. The connection status 134 may indicate a signal strength, the signal-to-noise ratio, the signal-to-interference-plus-noise ratio, and any other similar signal parameters.

The server 110 provides, for output to a second computing device 114, the second audio data 148 (430). The second computing device 114 receives the second audio data 148 and outputs the second audio data 148 through a speaker or other audio output device. The user 113 hears the second audio data 148 and may continue the voice call by speaking into a microphone or other audio receiving device of the second computing device 114.

In some implementations, the server 110 includes a voice authenticator 146. The voice authenticator 146 may generate authentication data 152 that indicates whether the server 110 changed the voice of the audio data 148. The server 110 may provide the authentication data 152 to the second computing device 114. The second computing device 114 may provide an output indicating the contents of the authentication data 152. The authentication data 152 may indicate whether the server 110 changed the voice of the second audio data 148. The authentication data 152 may indicate an identity of the voice 144.

In some implementations, the second computing device 114 may determine an identity of the user 102 of the first computing device 104 based on the second audio data 148. The second computing device 114 may include a speaker identifier 160 that is configured to use speaker identification rules 162 and/or speaker identification models 164 to determine the identity of the user 102. In some implementations, the first computing device 104 changes the voice of the audio data before providing the audio data to the server 110. In this case, the server 110 may include a speaker identifier that may determine an identity of the user 102 of the first computing device 104 based on the audio data received from the first computing device 104. The server 110 may provide data identifying the user 102 to the second computing device 114.

In some implementations, the server 110 may receive, from the second computing device 114, a request to transmit the first audio data 112 instead of the second audio data 148. This request may be similar to a request for the server 110 to stop changing the voice of the first audio data 112. The server 110 may receive that request and cease outputting the second audio data 148 and output the first audio data 112. Similarly, the server 110 may cease changing the voice of the audio data received from the first computing device 104 and provide the second computing device 114 with the audio data without changing the voice.

In some implementations, the user 102 of the first computing device 104 and/or the user 113 of the second computing device 114 may pay for the service of changing the voice of the audio data 112. The server 110 may confirm that the user 102 of the first computing device 104 and/or the user 113 of the second computing device 114 has paid before changing the voice of the first audio data 112. The server 110 may confirm that the user 102 of the first computing device 104 and/or the user 113 of the second computing device 114 paid before implementing any preferences of the user 102 and/or the user 113 related to voice changing and/or voice authentication.

In some implementations, the process 400 may be performed by a computing device such as a mobile phone. The process 400 may be performed by the operating system of the computing device and/or a native application running on the computing device. The operating system and/or the native application may include a speech recognizer, voice selector, and a speech synthesizer. The operating system and/or the native application may allow the user to provide user preferences that are stored on the computing device. The operating system and/or the native application may access location data that may be generated by a GPS receiver on the computing device. The operating system and/or the native application may include a context identifier that is configured to determine the context of the computing device. The operating system and/or the native application may include a connection monitor that is configured to monitor the connection with the computing device and an access point to the network. The connection monitor may determine the signal strength, bandwidth, and/or other connection parameters of the connection between the computing device and the access point. The operating system and/or the native application may include voice selection rules and/or voice selection models that the voice selector uses to select a voice. As the user speaks, the speech recognizer generates a transcription of the user's speech. The speech synthesizer generates new speech in the selected voice using the transcription. The computing device outputs the synthesized speech in the selected voice.

In the case where the process 400 is performed by the operating system of the computing device and/or a native application running on the device, any of the speech recognizer, voice selector, context identifier, connection monitor, speech synthesizer, voice selection rules, voice selection models, mobility manager, and/or user preferences may be located on a server that is communicating with the operating system and/or the native application. For example, the computing device may receive the audio data of the speech of the user. The application may include a speech recognizer that transcribes the audio data. The application may transmit the transcription to the speech synthesizer on the server. The server may generate the synthesized speech in the selected voice and transmit the synthesized speech back to the computing device. The computing device may output the synthesized speech.

Figure 5:
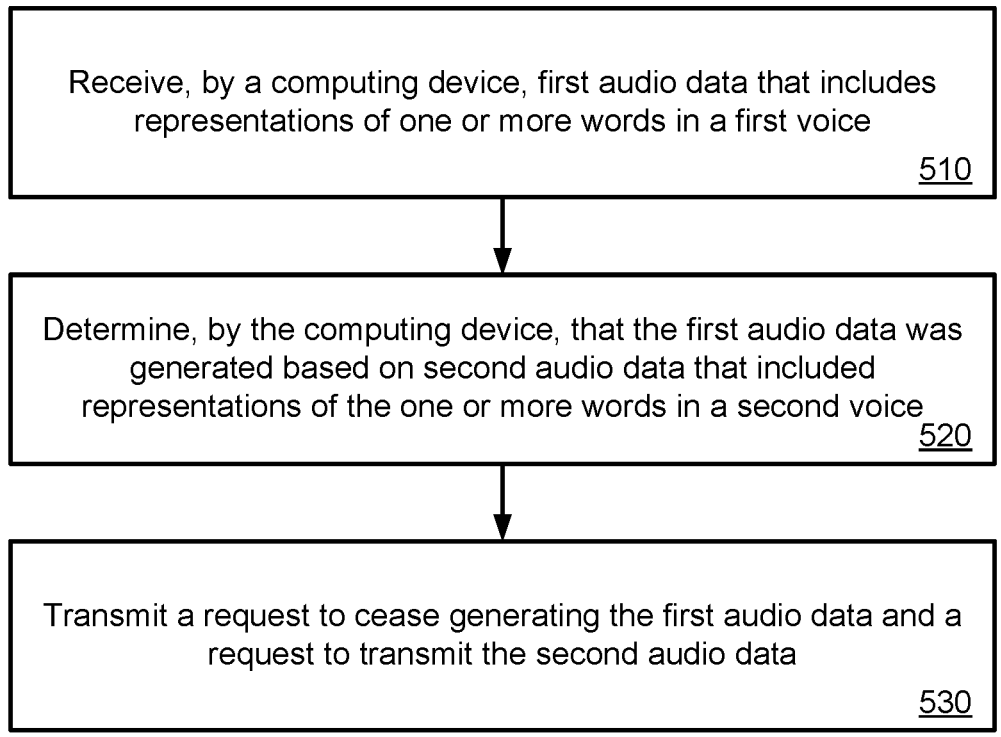
FIG. 5 is a flowchart of an example process for reverting the voice of a user from a changed voice to the user's own voice.

FIG. 5 is a flowchart of an example process 500 for reverting the voice of a user from a changed voice to the user's own voice. In general, the process 500 receives audio data that encodes the speech of a user. The process 500 determines that the voice of the audio data is not the same as the voice of the user. The process 500 requests to cease receiving the audio data in the changed voice. The process 500 will be described as being performed by the computing device 114 of FIG. 1 and will include references to other components in FIG. 1. The process 500 may also be performed by the server 200 of FIG. 2 and/or the client device 300 of FIG. 3.

The computing device 114 receives first audio data that includes representations of one or more words in a first voice (510). The user 113 of the computing device 114 may be conducting a voice call with the user 102 of another computing device 104.

The computing device 114 determines that the first audio data was generated based on second audio data that included representations of the one or more words in a second voice (520). Based on analyzing the first audio data, the computing device 114 may determine that the voice of the first audio data is not the same as the voice of the user 102. The computing device 114 may make this determination based on one or more factors.

In some implementations, the computing device 114 may include a speaker identifier 160 that is configured to determine the identity of the user 102. In some implementations, the computing device 114 may receive authentication data 152 indicating that the voice of the first audio data is different than the voice of the user 102. In some implementations, the computing device 114 may receive an indication from the user 113 indicating that the voice of the first audio data is different than the voice of the user 102.

The computing device 114 transmits a request to cease generating the first audio data and a request to transmit the second audio data (530). The computing device 114 may automatically transmit this request based on preferences of the user 113. The preferences of the user 113 may indicate that the user 113 wishes to hear the real voice of the user 102 and/or any other user when participating in voice calls. The computing device 114 may transmit this request in response to input from the user 113. For example, the user 113 hears the first audio data from the speaker of the computing device 114 and the voice of the first audio data is a cartoon voice. If the user 113 does not want to listen to a cartoon voice, then the user 113 may provide a request to the computing device 114 to no longer change the voice of the user 102 and, instead, transmit the audio data of the speech of the user 102 to the computing device 114

Figure 6:
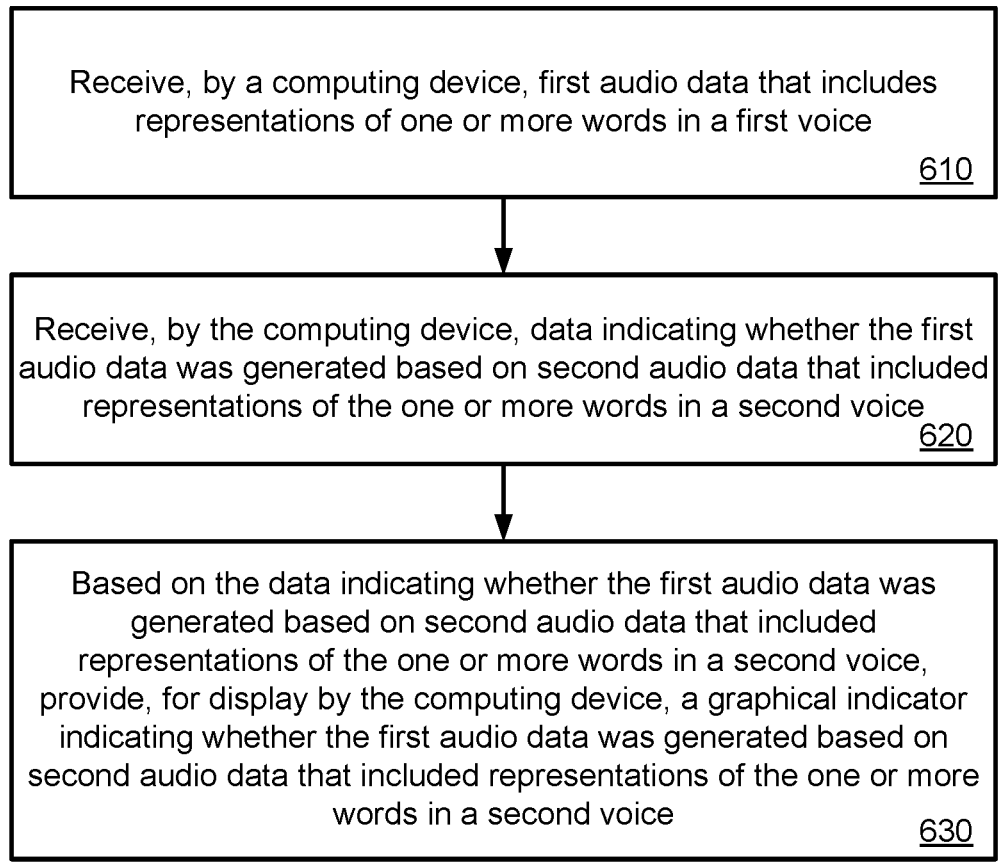
FIG. 6 is a flowchart of an example process for indicating to a user whether the voice of the other party is the other party's own voice.

FIG. 6 is a flowchart of an example process 600 for indicating to a user whether the voice of the other party is the other party's own voice. In general, the process 600 determines whether audio data that encodes speech is in the same voice as the voice of the speaker who initially spoke the utterance. The process 600 provides an indication to a user 113 whether the audio data encodes speech in a changed voice. The process 600 will be described as being performed by the computing device 114 of FIG. 1 and will include references to other components in FIG. 1. The process 500 may also be performed by the server 200 of FIG. 2 and/or the client device 300 of FIG. 3.

The computing device 114 receives first audio data 148 that includes representations of one or more words in a first voice (610). The user 113 may be using the computing device 114 and participating in a voice call with the user 102. The user 102 may have spoken the utterance 106 that included the one or more words.

The computing device 114 receives data indicating whether the first audio data was generated based on second audio data that included representations of the one or more words in a second voice (620). The server 110 may include a voice authenticator 146 that is configured to determine whether the first voice of the first audio data 148 matches the voice of the user 102 and/or whether the first voice of the first audio data 148 matches an initial speaker of the one or more words. The voice authenticator 146 may receive an indication from the speech synthesizer 142 indicating that the first voice of the first audio data 148 does not match the initial speaker of the one or more words.

Based on the data indicating whether the first audio data was generated based on second audio data that included representations of the one or more words in a second voice, the computing device 114 displays a graphical indicator indicating whether the first audio data 148 was generated based on second audio data that included representations of the one or more words in a second voice (630). The graphical indicator may provide the user 113 with assurance that the first audio data 148 is in the voice of the user 102 who spoke the utterance 106 that included the one or more words in the case where the first audio data 148 was not generated based on second audio data. This may allow the user 113 to trust the speaker if the subject of the voice call is a sensitive topic. If the first audio data 148 was generated based on the second audio data, then the user 113 requests that the voice of the first audio data 148 change to a voice selected by the user 113 or request that the computing device 114 receive the second audio data.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
receiving, from a first computing device, first audio data that includes representations of one or more words in a first voice of a first speaker;
generating second audio data that includes representations of the one or more words in a second voice of a second speaker; and
providing, for output to a second computing device, the second audio data and data indicating an identity of the second speaker, wherein the second computing device is configured to analyze speech patterns of the second audio data, determine an identity of the first speaker, and output, to a second user of the second computing device, the identity of the first speaker and the identity of the second speaker.

2. The method of claim 1, comprising:
determining a first user of the first computing device;
determining the second user of the second computing device;
determining that the first user of the first computing device and the second user of the second computing device are conducting a conversation;
determining a context of the conversation; and
determining characteristics of a connection between the first computing device and the second computing device,
wherein generating the second audio data is based on one or more of:
the first user of the first computing device;
the second user of the second computing device;
the context of the conversation; and
the characteristics of the connection between the first computing device and the second computing device.

3. The method of claim 1, comprising:
selecting, from among multiple voices, the second voice of the second speaker.

4. The method of claim 1, wherein a first user of the first computing device or the second user of the second computing device selects the second voice of the second speaker.

5. The method of claim 1, comprising:
based on generating the second audio data, generating data indicating a voice change of the first audio data; and
providing, for output to the second computing device, the data indicating the voice change of the first audio data.

6. The method of claim 1, comprising:
receiving, from the second computing device, a request to transmit the first audio data that includes the representations of the one or more words in the first voice of the first speaker;
based on receiving the request to transmit the first audio data that includes the representations of the one or more words in the first voice of the first speaker:
ceasing to provide, for output to the second computing device, the second audio data; and
providing, for output to the second computing device, the first audio data.

7. The method of claim 1, comprising:
determining a first location of the first computing device;
determining a second location of the second computing device;
determining characteristics of a connection between the first computing device and the second computing device; and
selecting the second voice of the second speaker based on one or more of:
the first location of the first computing device;
the second location of the second computing device; and
the characteristics of the connection between the first computing device and the second computing device.

8. A system, comprising:
one or more processors; and
memory including a plurality of computer-executable components that are executable by the one or more processors to perform a plurality of actions, the plurality of actions comprising:
receiving, from a first computing device, first audio data that includes representations of one or more words in a first voice of a first speaker;
generating second audio data that includes representations of the one or more words in a second voice of a second speaker; and
providing, for output to a second computing device, the second audio data and data indicating an identity of the second speaker, wherein the second computing device is configured to analyze speech patterns of the second audio data, determine an identity of the first speaker, and output, to a second user of the second computing device, the identity of the first speaker and the identity of the second speaker.

9. The system of claim 8, wherein the actions comprise:
determining a first user of the first computing device;
determining the second user of the second computing device
determining that the first user of the first computing device and the second user of the second computing device are conducting a conversation;
determining a context of the conversation; and
determining characteristics of a connection between the first computing device and the second computing device,
wherein generating the second audio data is based on one or more of:
the first user of the first computing device;
the second user of the second computing device;
the context of the conversation; and
the characteristics of the connection between the first computing device and the second computing device.

10. The system of claim 8, wherein the actions comprise:
selecting, from among multiple voices, the second voice of the second speaker.

11. The system of claim 8, wherein a first user of the first computing device or the second user of the second computing device selects the second voice of the second speaker.

12. The system of claim 8, wherein the actions comprise:
based on generating the second audio data, generating data indicating a voice change of the first audio data; and
providing, for output to the second computing device, the data indicating the voice change of the first audio data.

13. The system of claim 8, wherein the actions comprise:
receiving, from the second computing device, a request to transmit the first audio data that includes the representations of the one or more words in the first voice of the first speaker;
based on receiving the request to transmit the first audio data that includes the representations of the one or more words in the first voice of the first speaker:
ceasing to provide, for output to the second computing device, the second audio data; and
providing, for output to the second computing device, the first audio data.

14. The system of claim 8, wherein the actions comprise:
determining a first location of the first computing device;
determining a second location of the second computing device;
determining characteristics of a connection between the first computing device and the second computing device; and
selecting the second voice of the second speaker based on one or more of:
the first location of the first computing device;
the second location of the second computing device; and
the characteristics of the connection between the first computing device and the second computing device.

15. One or more non-transitory computer-readable media of a computing device storing computer-executable instructions that upon execution cause one or more processors to perform acts comprising:
receiving, from a first computing device, first audio data that includes representations of one or more words in a first voice of a first speaker;
generating second audio data that includes representations of the one or more words in a second voice of a second speaker; and
providing, for output to a second computing device, the second audio data and data indicating an identity of the second speaker, wherein the second computing device is configured to analyze speech patterns of the second audio data, determine an identity of the first speaker, and output, to a second user of the second computing device, the identity of the first speaker and the identity of the second speaker.

16. The media of claim 15, wherein the acts comprise:
determining a first user of the first computing device;
determining the second user of the first second computing device
determining that the first user of the first computing device and the second user of the second computing device are conducting a conversation;
determining a context of the conversation; and
determining characteristics of a connection between the first computing device and the second computing device,
wherein generating the second audio data is based on one or more of:
the first user of the first computing device;
the second user of the second computing device;
the context of the conversation; and
the characteristics of the connection between the first computing device and the second computing device.

17. The media of claim 15, wherein the acts comprise:
receiving, from the second computing device, a request to transmit the first audio data that includes the representations of the one or more words in the first voice of the first speaker;
based on receiving the request to transmit the first audio data that includes the representations of the one or more words in the first voice of the first speaker:
ceasing to provide, for output to the second computing device, the second audio data; and
providing, for output to the second computing device, the first audio data.

18. The media of claim 15, wherein the acts comprise:
determining a first location of the first computing device;
determining a second location of the second computing device;
determining characteristics of a connection between the first computing device and the second computing device; and
selecting the second voice of the second speaker based on one or more of:
the first location of the first computing device;
the second location of the second computing device; and
the characteristics of the connection between the first computing device and the second computing device.

* * * * *